May 12, 1970  S. L. GILLESPIE  3,511,052
LOAD DIVIDING CONTROL FOR MULTIPLE ENGINE DRIVE
Filed April 25, 1968  2 Sheets-Sheet 1
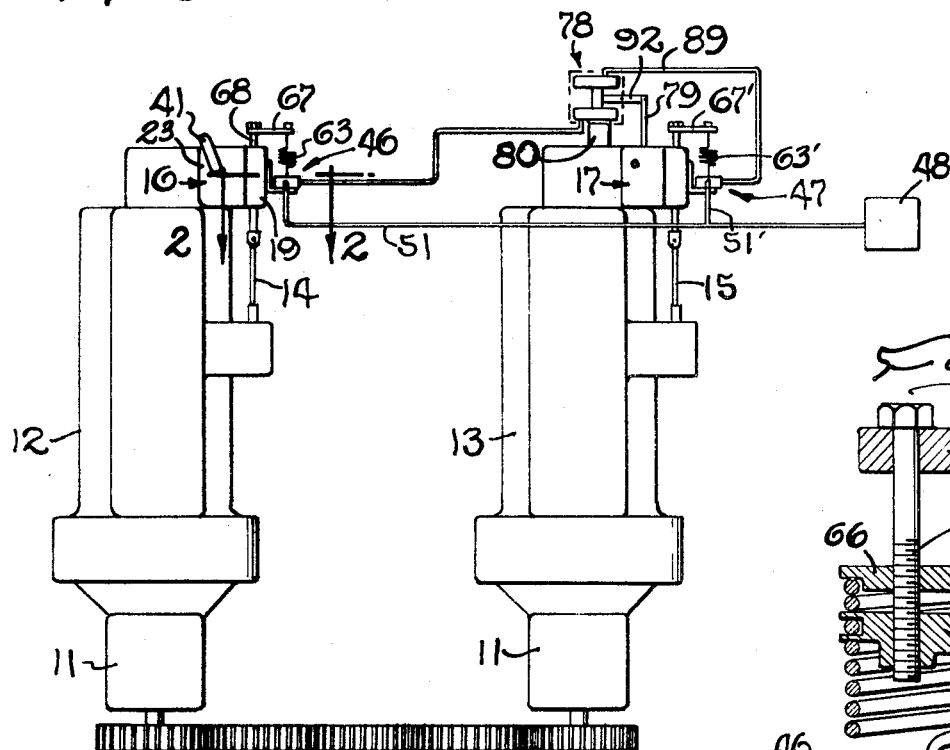
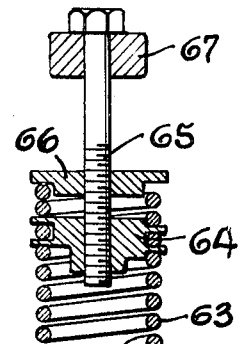
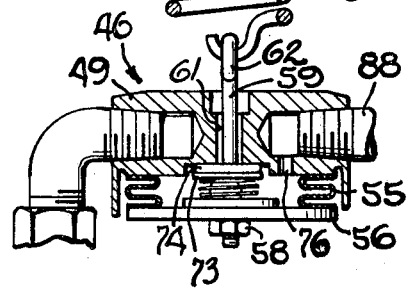
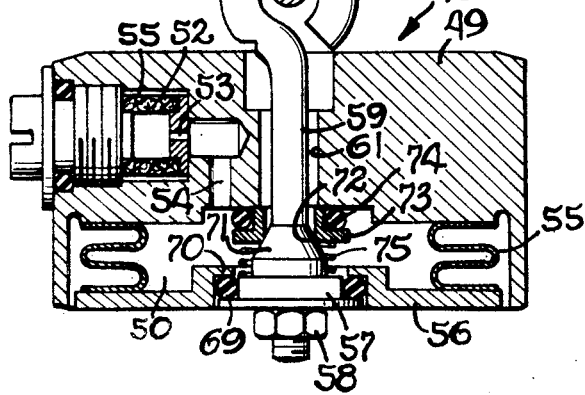
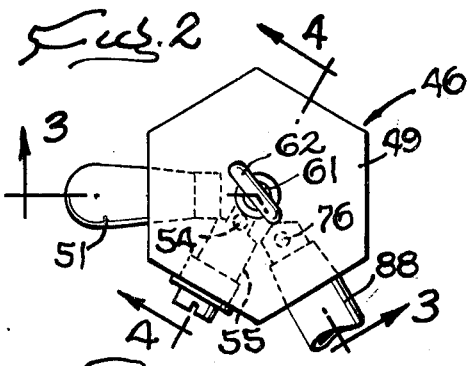
INVENTOR
Sidney L. Gillespie
By Wolfe, Hubbard, Voit & Osann
ATTORNEY

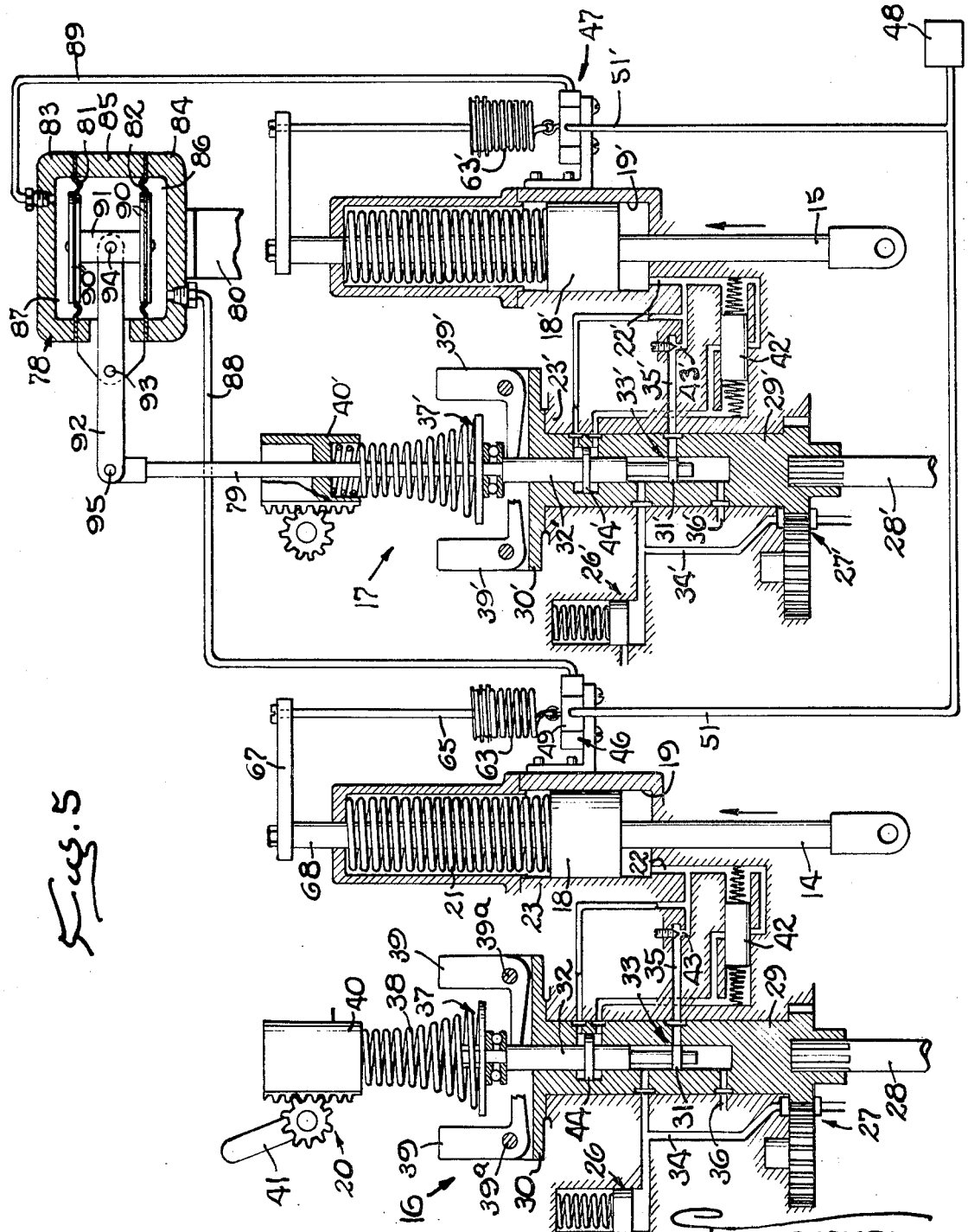

United States Patent Office 3,511,052
Patented May 12, 1970

3,511,052
LOAD DIVIDING CONTROL FOR MULTIPLE ENGINE DRIVE
Sidney L. Gillespie, Rockford, Ill., assignor to Woodward Governor Company, Rockford, Ill., a corporation of Illinois
Filed Apr. 25, 1968, Ser. No. 723,983
Int. Cl. F01b *21/00;* F02b *37/00;* G01b *3/04*
U.S. Cl. 60—97                                   8 Claims

ABSTRACT OF THE DISCLOSURE

Master and slave engines for driving a common output shaft are equipped with isochronous speed governors each having a transmitter deriving a pneumatic pressure signal corresponding to the fuel rod posititon of the governor. A differential device compares the two signals and the resulting pressure difference is exerted on the speed sensor of the slave governor to change the speed setting and thereby cause that governor to adjust its fuel rod to essentially the same position as that of the master governor, the prevailing load thus being divided equally between the two engines.

BACKGROUND OF THE INVENTION

When two or more prime movers are coupled together to drive a common load, it is customary to regulate the energy supply to the prime movers by individual speed governors adapted for operation with the same speed droop for the purpose of controlling the division of the load between the several prime movers. But, if the governors are set for four percent droop, for example, and the governor speed settings differ by two percent, a fifty percent error in load division will result during operation of the prime movers at full speed.

SUMMARY OF THE INVENTION

The present invention provides for close equalization of the common load between a plurality of prime movers without the necessity of accurate matching of the governor speed settings while permitting the use of an isochronous governor for each prime mover. Generally stated, this is accomplished by automatically adjusting the energy supply regulator, fuel rod, or throttle of one prime mover selected as the slave to correspond to that of a master prime mover by equipping the respective governors with fluid actuated transmitters which operate continuously to produce pressure signals corresponding in magnitude to the prevailing positions of the regulators of the respective prime movers. These signals are transmitted to and compared in a differential device to derive a differential pressure which is exerted on and varies the speed setting or loading of the governor of the slave engine in a direction to adjust the fuel rod of the latter and force the slave engine to carry essentially the same fuel as the master engine as determined by the speed setting of the master governor.

BRIEF DESCRIPTION OF THE DRAWINGS

FIG. 1 is a schematic view of a marine propeller drive incorporating the novel features of the present system.
FIG. 2 is a fragmentary plan view taken along the line 2—2 of FIG. 1.
FIGS. 3 and 4 are fragmentary cross-sections taken respectively along the lines 3—3 and 4—4 of FIG. 2.
FIG. 5 is a schematic view and fluid circuit diagram.

DESCRIPTION OF THE PREFERRED EMBODIMENT

In the drawings, the invention is shown incorporated in a drive for a marine propeller 10 adapted to be coupled through suitable clutches indicated at 11 to one or both of two prime movers such as Diesel engines 12 and 13 having energy supply regulators such as fuel rods or throttles 14 and 15 variably positioned by isochronous type speed governors 16 and 17 for the engine 12 selected as the master for the other or slave engine 13. The actuator for the fuel rod 14 comprises a piston 18 reciprocable in a stationary cylinder 19 formed in the casing 23 of the governor 16. The rod is urged by a compression spring 21 in the speed-decreasing direction and fluid under pressure is forced under the governor control into or released from the rod end of the cylinder through a passage 22 to control theenergization of the servo and therefore the position of the fuel rod.

The governor 16 is of the droopless or isochronous type as disclosed in Pat. 2,478,753, to which reference may be had for further details. Oil contained within the governor casing 23 is placed under a constant pressure by a spring loaded by-pass valve 26 and a gear pump 27 driven by the engine 12 through a shaft 28 coupled to a ported sleeve 29 carrying the governor ball head 30 and cooperating with a land 31 on a rod 32 to form a pilot valve 33. The latter controls the flow of pressure fluid from the supply line 34 to a space 35 or the escape of fluid from this space to a drain line 36.

The valve rod is slidable in the sleeve 29 and fixed to a head 37 urged downwardly by a compression type speeder spring 38 and upwardly by centrifugal force derived from flyweights 39 fulcrumed at 39a on the rotating ball head 30. The stress of the spring and therefore the setting of the governor to maintain different desired engine speeds is determined by the position of an abutment formed by the end of a sleeve 40 slidable in the casing 23 and coupled as by gearing 20 to a lever 41. The latter may be adjusted manually or by a remotely controlled power actuator to shift the abutment 40 and increase or decrease the spring compression and therefore the speed setting of the governor.

Pressure changes in the valve controlled space 35 are transmitted to the servo cylinder 19 through a spring loaded buffer piston 42 cooperating with a restriction 43 and the fluid passages shown to derive a pressure differential as an incident to each corrective action of the governor. As described in the aforesaid patent, these differentials are in opposite senses for speed increases and decreases and are applied to a piston 44 on the valve stem 32 in a direction to return the land 31 to neutral position following each speed change. This produces a drooping characteristic and stabilizing effect which is then dissipated by gradual leakage of fluid between opposite ends of the piston 42 and through the restriction 43. As a result, the governor sensor changes in the engine speed due to load changes and regulates the fuel flow to maintain constant speed and isochronous operation of the engine.

The servo for actuating the fuel rod 15 of the slave engine 13 and the slave governor 17 are of the same construction as that described above and the parts are indicated by the same but primed reference numbers.

For purposes of the present invention, a position sensor and signal transmitted 46 associated with the fuel rod 14 of the master governor 16 is adapted to respond automatically and continuously to changes in the fuel rod position and derive from a suitable source 48 of pressure fluid, compressed air in this instance, and transmit a pressure signal of a magnitude corresponding closely to such position and therefore to the prevailing rate of fuel supply to the master engine 12. The transmitter as shown in FIGS. 2, 3 and 4 is housed within a casing 49 secured to the side of the servo cylinder 19 and defining a chamber 50 to which air from the source 48 is admitted through a pipe 51, a passage 55a, a filter 52, a flow-limiting restriction 53 and a passage 54. An axially extensible bellows 55 defining the periphery of the chamber is secured at one end to the casing and at the other end to a movable wall in the form of a disk 56 centrally apertured to receive the flanged head of a valve member 57. The latter is telescoped on and abuts against a nut 58 on a rod 59 which extends through a hole 61 in the casing and formed with an eye 62. Hooked into the latter is one end of a contractile spring 63 stretched between the eyes and a nut 64 threaded onto a screw 65 carrying a nut 66 for locking the spring end to the nut. The screw head abuts an arm 67 rigid with and extending laterally from an extension 68 of the fuel rod 14. The spring tension compresses a seal ring 69 (FIG. 4) against the inner flanged edge 70 of the disk 56 and urges a frusto-conical end 71 of the valve member 57 against a seat 72 formed by the flange end of a ring 73 abutting a seal ring 74 compressed against the casing wall by a light spring 75.

With an outlet passage 76 from the chamber 50 closed against the escape of air, the member 57 will remain seated as shown in FIG. 4 and the chamber will be closed when the chamber pressure acting on the disk 56 is less than the pull exerted by the spring 63 in the increased fuel position of the servo piston 18. As the servo piston moves downwardly and the spring force decreases as a result of the governor action following a reduction in load on the master engine or a decrease in the speed setting of the governor thereof, the chamber pressure exerted on the wall 56 will be sufficient to overcome the spring force and move the valve member 57 away from the seat 72. Such opening of the valve and release of air from the chamber through the hole 61 and at a rate limited by the orifice 53 is accompanied by a decrease in the chamber pressure which continues until the total pressure on the disk 56 just balances the spring force. At this time, the escape of air to the atmosphere is the same as the rate of flow through the orifice 53 and the pressure within the chamber will remain constant. Similar adjustment of the valve occurs with each change in the position of the fuel rod 14 and, as a result, the escape of air from the chamber and through the passage is varied so as to establish within the chamber a pressure precisely corresponding in magnitude to the prevailing position of this fuel rod.

The governor of the slave engine is similarly equipped with a signal transmitter 47 of the same construction as the transmitter 46 and operating in the same manner to derive a pressure signal corresponding precisely in magnitude to the prevailing position of the fuel rod 15 as the latter is changed from time to time by the action of the governor 17. The parts of the transmitter 47 corresponding to those of the transmitter 46 are indicated by the same but primed reference numbers.

The transmitters 46 and 47, are, by correlating various factors including the orifices and valve openings and the spring force, adapted to produce pressure signals which correspond to the respective fuel rod positions which at any time match each other quite closely. It will be apparent that the force applied to and modifying the action of the slave governor is derived directly from the pressure produced by the respective transmitters 46 and 47. Under most service conditions, it is desirable to adjust these transmitters to produce pressures from 3 p.s.i. at the idle fuel position of their fuel rods to 15 p.s.i. at the full maximum engine speeds.

In accordance with the present invention, the pressure signals produced as above described are transmitted to and compared by a differential device 78 (FIG. 5) and the resulting pressure difference is transmitted to and exerted on an extension 79 of the valve rod 32' of the slave governor in a direction to change the speed setting of that governor and cause the latter to adjust the fuel rod 15 to a position corresponding closely to that of the master fuel rod 14. In the form shown herein, the differential device includes axially flexible diaphragms 81 and 82 (FIG. 5) clamped around their peripheries between end cups 83, 84 and the ends of a ring 85 rigidly mounted on a suitable bracket 80 on the casing of the slave governor 17 and with the axes of the diaphragms paralleling but offset from the valve rod extension 78. The chambers 86, 87 thus defined are respectively connected by pipes 88, 89 with the outlet passages 76, 76' of the transmitters 46, 47.

The centers of the diaphragms are clamped between pairs of disks 90 which are spanned and joined rigidly by a bar 91 which is subject to the oppositely directed forces exerted on the diaphragm by the pressure signals. The force differential may be transmitted to the valve rod extension 79 in various ways as by a lever 92 projecting transversely of the extension through an opening in the ring 85 and fulcrumed intermediate its ends on a pivot 93 supported by the ring. The inner end of the lever is pivotally connected at 94 to the bar 91 while the outer end is pivoted at 95 to the valve rod. Through this connection, the direction of the force differential is reversed and applied to the valve rod 79 in the fuel-increasing direction when the pressure in the chamber 86 exceeds that in the chamber 87 and in the fuel-decreasing direction when the pressure differential is in the opposite direction.

OPERATION

Assume that, with both engines 12 and 13 coupled to and driving the propeller 10, the speeder spring adjusters 41 and 41' have been set, either manually or by remote control for approximately the same engine speeds but, because of differences in such settings, the speeder spring and flyweight characteristics of the two governors, etc., the fuel rod 14 of the master engine is positioned under the control of the governor 16 to supply fuel at a somewhat greater rate than is being supplied to the slave engine in the then prevailing position of its fuel rod 15 as determined by the action of the slave governor 17.

In view of such differences and the resulting differences in the positions of the two fuel rods, the air pressure signal determined as above described by the position of the master governor fuel rod and transmitted to chamber 86 will be somewhat higher than the pressure produced in the chamber 87 by the transmitter 47 of the slave governor. As a result, the difference between the opposing pressures is transmitted through the lever 92 to the valve rod extension 79 and is added to the force of the speeder spring 38'. Thus, the resultant loading of the flyweights 39' of the slave governor becomes essentially equal to the then prevailing force of the spring 38 loading the flyweights 39 of the master governor.

Due to the increased loading of the flyweights 39', the energization of the servo 18', 19' is increased correspondingly and the fuel rod 15 creeps ahead thus increasing the supply of fuel to the slave engine. With the engines coupled positively, this fuel increase causes the speeds of both engines to increase and, as a result, the governor 16 will decrease the fuel supply to the master engine. The rates of fuel supply to the respective engines are thus brought close to each other but do not become exactly equal.

Such readjustment of the two fuel rods is of course accompanied by a decrease in the air pressure in the chamber 86 and a decrease in the pressure in the chamber 87. But the pressure difference which caused the readjustment remains and continues to be applied at the reduced value in loading the flyweights 39'.

With the control above described, the slave engine is forced to carry essentially the same fuel as the master engine thus equalizing the loads on the two engines. Operation of the governors with speed droop is unnecessary and in fact is undesirable. Also, inaccuracy in the speed settings of the two governors affects the accuracy of load division between the engines to a negligible degree. Thus, with Woodward PG type governors and assuming an error of two percent in the speed settings thereof, the error in the matching of the fuel supplies to the two engines will be only two percent when the engines are operating at 100 percent speed. At half npeed, the fuel eror would be only 0.5 percent.

I claim:

1. In combination with master and slave prime movers coupled together and driving a common load, master and slave speed governors driven by the respective prime movers and each having a selectively adjustable speed setter and a regulator movable back and forth and adjusting the supply of energy to the prime mover controlled thereby, a source of fluid under pressure a transmitter deriving from said source a first pressure corresponding to the position of the regulator of said master govenor, a second transmitter responsive to changes in the position of the regulator of said slave governor and deriving from said souce a second pressure corresponding to such position, and a differential device receiving and comparing said first and second pressures and exerting on the slave governor a force automatically modifying the speed setting thereof in a direction and by an amount such as to cause the slave governor to adjust the slave regulator to and maintain the same at all times in a position closely corresponding to the prevailing position of the regulator of the master governor.

2. A load matching system as defined in claim 1 in which the speed setting of said slave governor is determined by the force of a spring stressed by the governor speed setter combined with the modifying force applied by said differential device.

3. A load matching system as defined in claim 1 in which said master and slave governors operate isochronously and without speed droop.

4. A load matching system as defined in claim 1 in which said modifying force is derived directly from said pressure source.

5. The combination defined in claim 1 in which each of said transmitters comprises a chamber having a wall movable back and forth in response to pressure changes in the chamber, means supplying pressure fluid from said source to said chamber at a restricted rate, a valve controlling the escape of pressure fluid from said chamber and having a movable member, a resiliently yieldable element connecting said valve member to the associated regulator whereby to vary the opening and closing of said valve and maintain in the chamber a pressure corresponding to the position of such regulator, the characteristics of said first and second transmitters being correlated with each other and controlling the action of said differential device so as to maintain the master and slave regulators in closely matching energy-supply positions at all times.

6. For matching the loads carried by coupled first and second prime movers driving a common load, the combination of, first and second regulators individually movable back and forth to adjust the supply of energy to the respective prime movers, a speed governor having a selectively adjustable speed setter and operable to position said second regulator for controlling the speed of said second prime mover, a source of fluid under pressure, a transmitter deriving from said source a first pressure corresponding to a desired position of the said first regulator, a second transmitter responsive to changes in the position of the regulator of said governor and deriving from said source a second pressure corresponding to such position, and a differential device receiving and comparing said first and second pressures and exerting on said governor a force automatically modifying the speed setting thereof in a direction and by an amount such as to cause the slave governor to adjust the second regulator to and maintain the same at all times in a position closely corresponding to the prevailing position of said first regulator.

7. A load matching system as defined in claim 6 in which the speed setting of said slave governor is determined by the force of a spring stressed by the governor speed setter combined with the modifying force applied by said differential device.

8. In combination with master and slave prime movers coupled together and driving a common load, master and slave speed governors adapted to be driven by the respective prime movers and each having a selectively adjustable speed setter and a regulator movable back and forth and adjusting the supply of energy to the prime mover controlled thereby, means responsive to changes in the position of the regulator of said master governor for deriving a signal corresponding in magnitude to such regulator position, means responsive to changes in the position of the regulator of said slave governor and deriving a second signal corresponding in magnitude to such position, and a differential device receiving and comparing said first and second signals and exerting on the slave governor a force automatically modifying the speed setting thereof in a direction and by an amount such as to cause the slave governor to adjust the slave regulator to and maintain the same at all times in a position closely corresponding to the prevailing position of the regulator of the master governor.

References Cited

UNITED STATES PATENTS 2,254,970  9/1941  MacNeil.
2,269,332  1/1942  Bench et al.
2,370,149  2/1945  Couch.

MARTIN P. SCHWADRON, Primary Examiner

R. R. BUNEVICH, Assistant Examiner

U.S. Cl. X.R.

73—510